Figure 1:
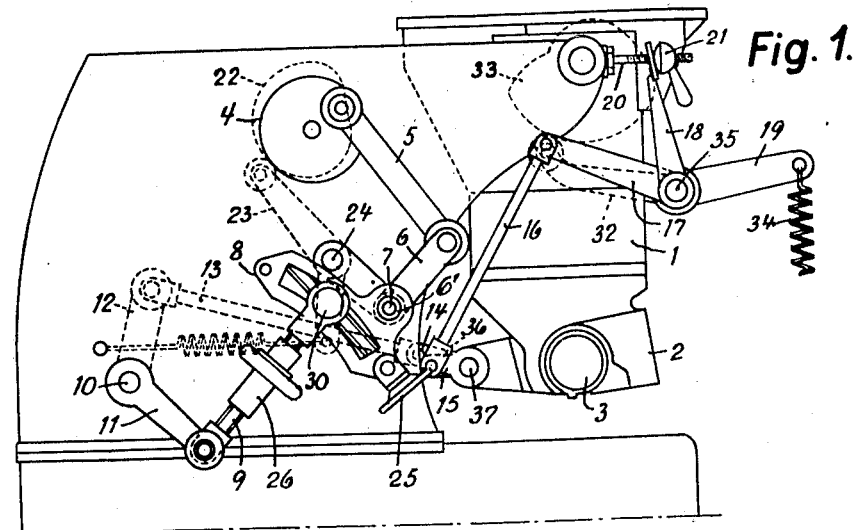

Sept. 29, 1936.                     J. J. JENSEN                       2,055,605
                MACHINE FOR THE MANUFACTURE OF FILLED CHOCOLATES
                      Filed July 13, 1934            4 Sheets-Sheet 1

Inventor.
JENS JOHANNES JENSEN.
By Haseltine Lake &Co
                ATTORNEYS.

Sept. 29, 1936. J. J. JENSEN 2,055,605
MACHINE FOR THE MANUFACTURE OF FILLED CHOCOLATES
Filed July 13, 1934 4 Sheets-Sheet 2

Inventor.
JENS JOHANNES JENSEN
By Haseltine Lake &c
ATTORNEYS.

Sept. 29, 1936.  J. J. JENSEN  2,055,605
MACHINE FOR THE MANUFACTURE OF FILLED CHOCOLATES
Filed July 13, 1934  4 Sheets-Sheet 3

Inventor.
JENS JOHANNES JENSEN
By Haseltine Lake & Co
Attorneys.

Sept. 29, 1936.   J. J. JENSEN   2,055,605
MACHINE FOR THE MANUFACTURE OF FILLED CHOCOLATES
Filed July 13, 1934   4 Sheets-Sheet 4
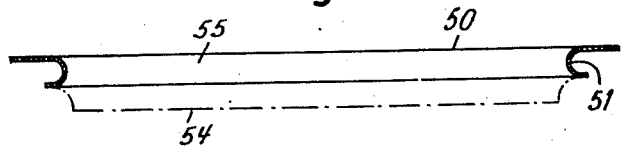
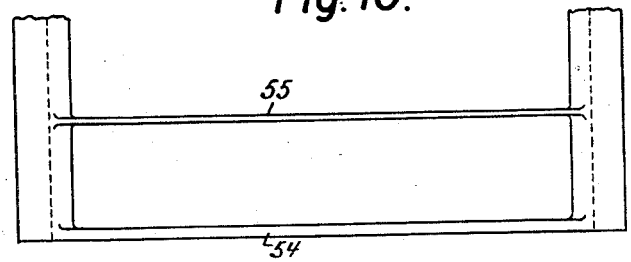
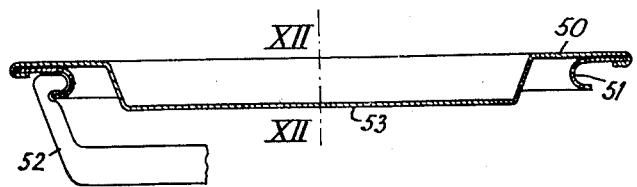
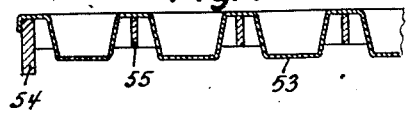
Inventor.
JENS JOHANNES JENSEN
By Haseltine Lake & Co
Attorneys.

UNITED STATES PATENT OFFICE 2,055,605

MACHINE FOR THE MANUFACTURE OF FILLED CHOCOLATES

Jens Johannes Jensen, Copenhagen, Denmark, assignor to Boggild & Jacobsen, Copenhagen, Denmark Application July 13, 1934, Serial No. 734,885
In Germany July 18, 1933

6 Claims. (Cl. 107—28)

For the manufacture of filled chocolates, confections and the like, machines are known which are arranged in such a manner that they first pour a chocolate shell into the moulds in mould plates moving past the chocolate-pouring device, after which the moulds pass below a crème-pouring device, which pours into the said shell the crème itself, or whatever substance is to form the core of the confection, after which the shell is closed with a cover, which is subsequently cast into position.

The difficult point in such machines has been to pour the crème, owing to the special consistency thereof, which causes the pouring to be extremely difficult, as the said crème, when being poured, has a consistency much like a tough slimy mass, which by the pouring is pulled out into long tough threads depositing themselves on the top side of the mould plates and preventing the subsequent pouring of the cover, and the main object of the present invention, in connection with machines of the kind mentioned above, is to render practicable the pouring of crème into the previously cast chocolate shells, in such a manner that the tough thread formed at the end of the pouring process is moved back over the casting, so that it does not deposit itself on the top side of the mould plates.

In order to attain this result, it is also an object of the present invention partly to raise the moulds during the deposition of the crème, in such a manner that they come directly below the pouring orifice, and partly to cause the pouring hopper, after the pouring is finished, to swing back exactly at the level of the mass poured.

The said moulds are hollow cups of various shapes, a greater or smaller number of which moulds are provided in mould plates, which are supported on mould frames adapted to be pushed into position on mould-frame holders provided on endless chains, in such a manner that the mould frames can easily be pushed on to and again removed from the mould-frame holders.

This exchange of the mould frames is effected when chocolates of other shapes are to be cast.

It is absolutely necessary that the mould plates with the moulds formed therein should have a plane and smooth surface, and that the said mould plates should project beyond the mould frames and the mould-frame holders and the machinery below the same, since thereby it becomes possible to scrape away from the mould plates any superfluous chocolate, and it is thus a further object of the invention to provide a special arrangement of these mould plates and the parts connected thereto.

At the same time it is necessary, owing to the very variable sizes of the confections to be cast, to use a series of pouring nozzles, which are not made integral with the oscillating pouring valve itself, but on the other hand it is necessary, like in the valve known per se, to be able to vary the spacing, size, shape and diameter of the pouring nozzles.

The invention therefore includes, around the known oscillatory valve, which alternately connects the pouring cylinder with the pouring hopper and with the pouring nozzles, a cylindrical sleeve in such a manner that for the various moulds a series of different sleeves with pouring nozzles are provided, the said nozzles being disposed at various mutual distances and being of the various sizes, diameters and the like corresponding to the castings to be made.

In the following, a description is given of all the parts belonging to an automatic device for pouring the crème and entering as a link in a complete confection casting machine of the kind comprising a continuously moved mould conveyor supporting fixed mould-frame holders with exchangeable mould frames with mould plates containing the said moulds, which are filled with chocolate in such a manner that the quantity poured, the length of the pouring, the number of rows and skips from one mould plate to the next one can be regulated, after which the mould plates with the moulds, after having been filled with chocolate mass, will pass a shaking table and will be turned upside down in such a manner that the surplus chocolate runs off. Then the moulds pass a cooling closet in order to be cooled sufficiently to a very low temperature, so that the crème received may be as hot as possible without fusing the chocolate shell formed. Now the crème is poured into position, and then the moulds pass another vibrating table, a cooling closet and a heating device in order to melt the top edge of the chocolate shell, before the covering layer is applied. Then the covering layer is applied, the surplus material is scraped away, and the moulds now pass over a shaking table to a cooling closet, after which the finished confections are finally shaken out from the moulds.

A distinguishing and necessary condition for the invention is that the conveyor band, during the entire operation, should move at the same speed, and a receiving conveyor is provided below the mould conveyor moving at the same speed and in the same direction as the mould conveyor in order to ensure that the finished confections should always drop out at the proper point, so that the product comes out properly arranged in rows.

Figure 2:
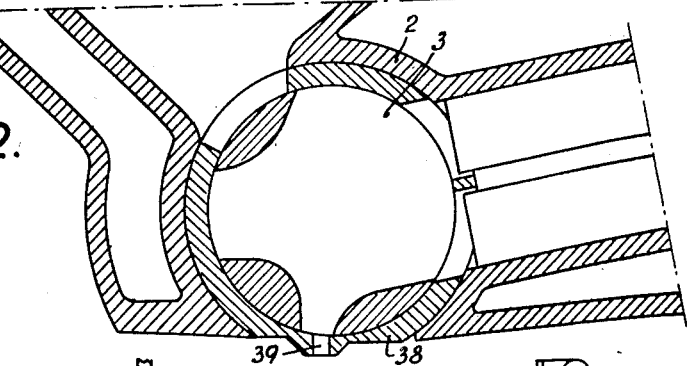
Figure 6:
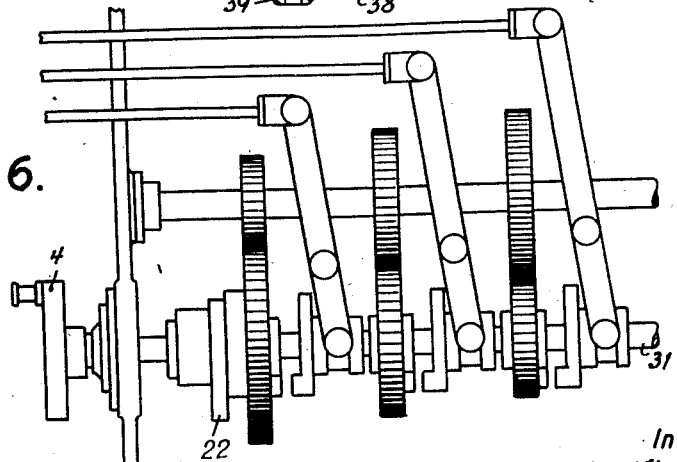
Figure 4:
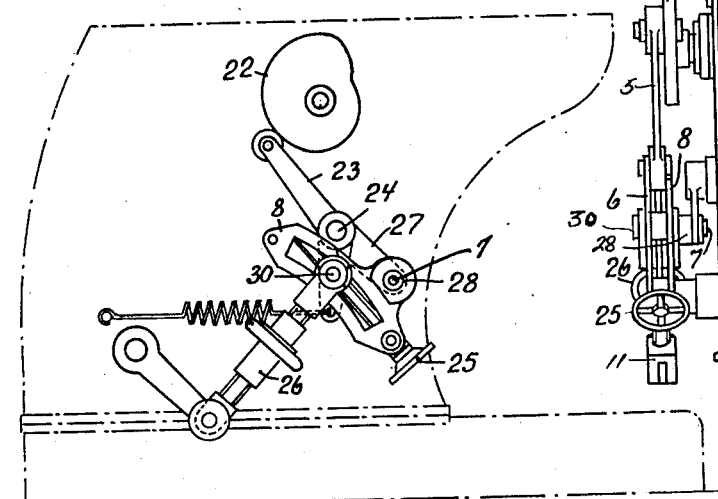
Figure 3:
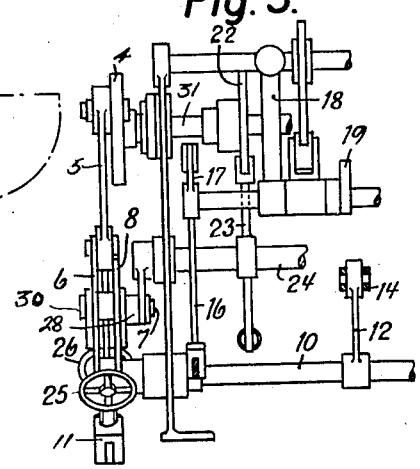
Figure 5:
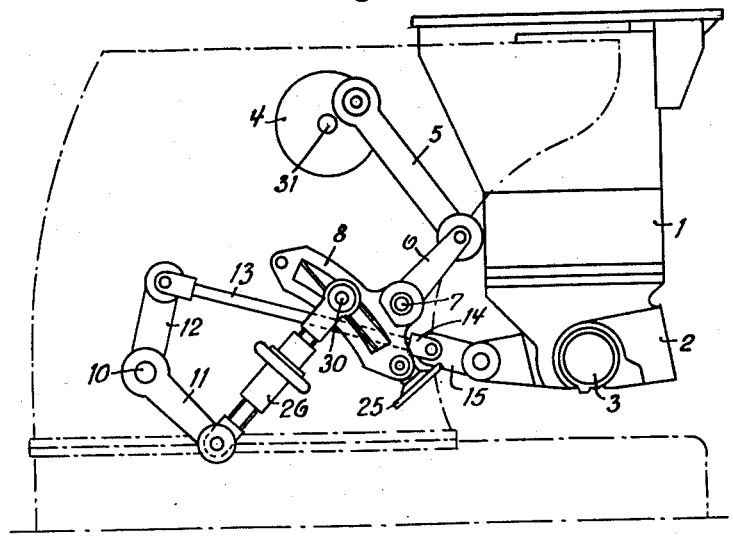
Figure 7:
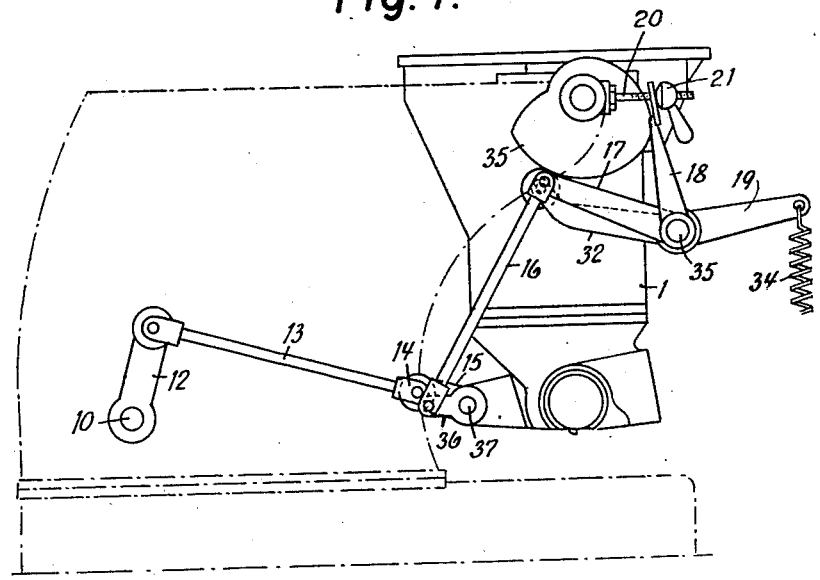
Figure 8:
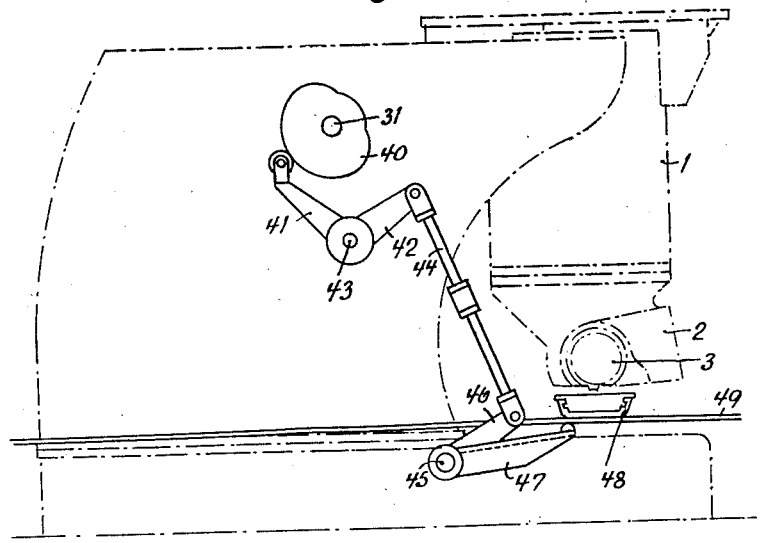

One single construction of the invention is shown by way of example in the accompanying drawings in which Fig. 1 shows the mechanical parts belonging to the pouring of crème in connection with the pouring hopper, in side elevation, Fig. 2 shows, to a larger scale, a cross-section of the valve of the pouring machine, Fig. 3 shows, in end elevation, the parts shown in Fig. 1, Fig. 4 shows the mechanical arrangements effecting the oscillation with the skip from the last pouring in one mould plate to the first pouring in the next mould plate, Fig. 5 shows the mechanical parts effecting the oscillation of the hopper during each pouring, Fig. 6 shows, in top view, a power-transmitting device adapted to vary the number of pourings according to the number of moulds in the individual mould plate, Fig. 7 shows, in side elevation, the device enabling a regulation of the length of the return oscillation to be effected, Fig. 8 shows the mechanism serving to raise the mould plates during the pouring of crème, Fig. 9 is a vertical cross-section of a mould frame, Fig. 10 the same in top view, Fig. 11 shows, in vertical section, a mould plate with moulds, mould frame and a portion of a mould-frame holder, and Fig. 12 is a longitudinal section along the line XII—XII in Fig. 11.

In the drawings 1 is the pouring hopper with pumping devices 2 and pouring valve 3. The hopper is oscillated by a crank disc 4 with a connecting rod 5, which swings an arm 6 about a shaft 7. The arm 6 is rigidly connected by a sleeve 6' upon shaft 7 with a quadrant 8, the sliding block of which is pivoted to a link 9, which by means of a double-armed bell-crank lever 11, 12 pivoted about a pin 10 transmits an oscillating motion to the pouring hopper by way of a rod 13. This rod, however, is linked by being connected by means of a fork 14, see Figs. 5 and 7, to a short link 15, which is attached to the bottom part of the pouring hopper. On the same shaft as the crank disc 4 a cam disc 22 is provided, which co-operates with a lever 23 pivoted about a shaft 24.

The pouring hopper has to perform three mutually independent oscillations, viz firstly an oscillation whenever a row of moulds in a mould plate passes the point of pouring, which oscillation serves to regulate the length of the pouring relatively to the individual moulds in a mould plate, secondly a special oscillation whenever the pouring hopper has to skip the longer space between the last row of moulds in one mould plate and the first row of moulds in the next mould plate, and thirdly a return swing after each pouring, in order to return the above mentioned tough threads to the crème mass poured into the mould, in such a manner that they are smeared out on the surface of the material deposited therein.

The first oscillation of the hopper, i. e. the oscillation the hopper has to perform in order to determine the length of pouring, is produced by means of the crank disc 4, Fig. 5, as the motion of the latter is transmitted through the arm 5 and the arm 6 to the quadrant 8, the sliding block 30 of which, as mentioned above, transmits the motion to an axially adjustable link 9, the free end of which is linked to a two-armed lever 11, 12, which is pivoted about a pin 10. The lever 12 is similarly linked to a rod 13, the free end of which is fitted with a fork 14, which by means of a link 15 is connected to the hopper. As the crank disc 4 makes one revolution for each row of moulds in each mould plate passing the hopper 1, one double oscillation of the hopper will thus be performed for each row of moulds.

Since mould plates may be used containing rows of confection moulds or crème-bar moulds of different lengths, the length of oscillation must be capable of being varied, and this variation is effected by adustment of the block 30 in the quadrant 8 by a rotation of the hand wheel 25. Similarly the point of pouring can be adjusted relatively to the moulds by the rotation of a nut 26 fitted with a hand wheel.

The second oscillation of the hopper, viz the oscillation taking place by the skipping of the space between the last row of moulds in one mould plate and the first row of moulds in the following mould plate, is effected by means of a cam disc 22, Fig. 1, provided on the shaft 31 of the cam disc 4, which disc will always make one revolution for each mould plate moving past, while on the contrary the number of revolutions of the crank disc 4 can be varied corresponding to the number of rows of moulds on the individual mould plate. This variation of the number of revolutions of the crank disc 4 is effected by adjustment of a suitable gear transmission. Fig. 6 shows an arrangement with three different gears, in such a manner that the cam disc 4 can be caused to make one, two or three revolutions, for each revolution of the cam disc 22. It is clear that by a variation of the intermediate wheels in this gear transmission the number of revolutions of the cam disc 22 relatively to the revolutions of the cam disc 4 can be varied in other ratios than indicated here.

The cam disc 22, when rotating, actuates a double arm lever 23, 27, Fig. 4, which is pivoted about a pivot pin 24. One end 27 of this lever 23, rigidly supports the shaft 7 forming the pivot of an oscillating mounting or bearing 28 for the quadrant 8. By these means the quadrant will receive an oscillating motion, which by way of the described arms and links 9, 11, 12, 13, 14 and 15 is transmitted to the hopper 1. By this arrangement the advantage is attained that the hopper, besides the oscillation given by the crank disc 4, receives for each pouring also an extra oscillation corresponding to the special skipping from one mould plate to the following mould plate. The amplitude of this special oscillation and the timing of the same relatively to the mould plates moving past may be varied by exchanging the cam disc 22 or by the insertion of adjusting mechanisms at other points of the system described.

After each pouring the hopper 1, as mentioned above, has to be given a variable and adjustable return swing in order to move the tough threads from the crème to the top surface of crème deposited. This motion is effected by a lever mechanism comprising a double-armed lever 19, 32, one arm 32 of which co-operates with a cam disc 33, while the other arm 19 is actuated by a spring 34. The same pivot shaft 35 supports two other arms 17 and 18, the said arm 17 being linked to another rod 16, the bottom end of which is fitted with a fork engaging a small pivoted arm 36 on the shaft 37, Fig. 7, which also supports the link 15 mentioned above. The other arm 18 terminates in a fork engaging a threaded pin 20, which co-operates with a wing nut 21. This arrangement serves, as mentioned above, to regulate the length of the return of the hopper 1. If the wing nut 21 is screwed to the left, the arm 32 is pushed away from the bottom position of the cam disc 33, in such a manner that the travel of the said arm will be relatively short, and if the nut 21 is turned back, the spring 34 pulling the arm 32 upward against the cam disc 33 will cause a longer swinging of the said arm 32. By these means the return swings of the hopper can be made shorter or longer corresponding to the length of the individual tough threads of pouring, and to the length of the castings themselves.

As mentioned repeatedly, the difficulty in all crème pourings is the remarkable tough consistency of the crème itself, as a cutting off at the pouring nozzle causes the last part of the individual pouring to be drawn out as a tough string, which is extremely difficult to remove. For this purpose there is provided in the pouring nozzle of the hopper, besides the cylindrical valve 3 known per se, a fixed cylindrical pouring member 38 fitted with spouts 39. The number of these pouring spouts corresponds to the number of moulds in each individual row of moulds.

The said cylinder 38 may be inserted in the bottom piece of the hopper, and may enclose the oscillating cylindrical slide valve 3 itself. The cylinder 38 has for its object to secure a cutting off or finish of the mass of crème poured, which mass when pressed out through the pouring spouts 39 into the mould raised immediately before the pouring, will constitute the mass to be poured into the individual mould, in such a manner that the bottom edge of the pouring spouts 39 will be at the same level as the surface of the mass poured. When the entire pouring hopper is then swung back, the string formed by the pouring will be moved back, and will be smeared out on the crème already poured, whereby the end of the pouring will be caused to cease by the shearing of the flow of crème between the spouts upon the cylindrical member 38 and the inner cylindrical valve member 3, the so-called string being wiped back upon the crème already deposited in the moulds.

A further object of the cylinder 38 is to enable the points of pouring to be adjusted according to the various moulds in the various mould plates, which may contain one, two, three or more rows of moulds with a varying number of moulds in each row, and in consequence the pouring device must comprise means enabling the pourings to be effected at the points corresponding to the moulds in the mould plates. In explanation of this point it may be mentioned that in the same machine there may at certain times be poured crème plates, four moulds for which may for instance be placed side by side in one and the same mould plate, and the cylinder 38 inserted will therefore be fitted with four pouring nozzles 39 with quite large dimensions. Immediately thereafter it may perhaps be required to pour small confections, twelve of which may for instance be poured in one row on account of their small size. Consequently a cylinder 38 with twelve pouring nozzles 39 of considerably smaller dimensions has to be inserted.

It has been mentioned above that the moulds are raised during the pouring, in such a manner that the surface of the mould plates comes directly below, or at the same level as the bottom edge of the pouring nozzles 39. This lifting and lowering of the mould plates is effected by the arrangement shown in Fig. 8. The above mentioned shaft 31 is fitted with a cam disc 40, which co-operates with a double-armed lever 41, 42 pivoted about a pin 43. The free end of the arm 42 is attached to a connecting rod 44, the other end of which co-operates with an arm 46 provided on a shaft 45, whereby the shaft 45 is caused to swing back and forth in accordance with the rotations of the cam disc 40. The shaft 45 is further fitted with a couple of lifting arms 47, one below each of the resilient rails supporting the mould chain but not shown on the drawings.

Fig. 8 shows a mould-plate holder 48 on the mould-conveyor 49, and when the disc 40 presses the arm 41 downward, the two arms 47 will evidently raise the rails supporting the conveyor band 49 and, thereby press upward, against the nozzles 39, the mould-plate holders on the rails with the mould plates attached thereto. The size and curvature of the disc 40 is adjusted in such a manner that the moulds can only be pressed upward during the crème-deposition itself and during the return motion of the hopper 1 above the moulds 48 for the purpose of smearing out the strings formed by the pouring.

If still, after the return motion of the hopper after the pouring, a small remainder of the above mentioned tough string of crème mass be left in the orifice of the nozzles 39, the same will be broken off by the lowering of the moulds, before the commencement of the new oscillation of the hopper.

Figs. 9–12 show that the mould plates themselves consist of a sheet or the like of tinplate or some other suitable substance 50 attached to a mould frame 51 made from U-shaped iron bars, in such a manner that the top side of this frame projects beyond the bottom side thereof and, as shown in Fig. 11, can be pushed into position on a mould-plate holder 52. In the mould plate 50 the individual moulds 53 are formed for instance by stamping, as shown on the drawings. On account of the upper leg of the U-shaped frame being so much wider than the lower leg of the frame the said frame will project beyond the part 52 of the mould-plate holder, in such a manner that the entire mould plate will present a perfectly smooth surface especially adapted to co-operate with a scraper. For the sake of reinforcing the moulds, supporting rails 54 and 55 are provided between the frame parts 51.

Having now described my invention what I claim as new and desire to secure by Letters Patent is:

1. In an automatic machine for manufacturing confections, having a conveyor adapted to carry a plurality of rows of moulds, a frame supporting a swingable pouring hopper above the conveyor for fluent confection material, a first means for imparting one distinct oscillation to said hopper for each row of moulds, means imparting a second oscillation and thereby causing the hopper to skip a space between two moulds, and a third means imparting to said hopper a return oscillation in order to cause the final portion of the pouring from said hopper to be smeared upon the material already poured into the moulds.

2. In an automatic device according to claim 1, a valve controlled spout upon the lower portion of said hopper, and means for raising the moulds during the return oscillation of the hopper so that the confection material already poured is brought up to make contact with the spout.

3. In an automatic device according to claim 1, an oscillating valve disposed in the lower portion of the pouring hopper, and one of a series of interchangeable cylindrical members enveloping said valve and having a plurality of pouring spouts upon the same controlled by said valve.

4. An automatic machine according to claim 1, wherein the first means for oscillating the pouring hopper comprise a rotatable crank connected by linkage to a bell-crank lever which in turn is connected to the lower portion of the hopper, there being means for adjusting said linkage and thereby alter the length of the oscillation of the hopper according to the length of a given mould plate and its individual moulds.

5. An automatic machine according to claim 1, wherein the second means for oscillating the hopper comprise a rotatable cam, a rotatable crank connected by linkage to a bell-crank lever, link means connecting said bell-crank lever with a portion of said hopper, and a rocking lever pivoted upon the machine frame having one end operated by said cam and the other end forming a mounting for a part of said linkage so as to modify the oscillation imparted to said hopper.

6. An automatic machine according to claim 1, wherein the third means for oscillating the pouring hopper comprise a rotatable cam disc, a bell-crank lever actuated by said cam disc and connected at one end by means of link means to the lower portion of the pouring hopper, and means for adjusting said first bell-crank lever in order to prolong or shorten the actuation thereof by said cam disc, comprising an adjusting lever connected to said link means at one end, and to a spring at the other end, and an adjusting nut mounted upon a threaded member upon said machine bearing against one end of the latter lever in opposition to said spring.

JENS JOHANNES JENSEN.